United States Patent [19]
Deville

[11] Patent Number: 5,706,852
[45] Date of Patent: Jan. 13, 1998

[54] MULTI-ORIFICE PLATE CARRIER AND FITTING WITH POSITIONER, DIFFERENTIAL SELECTOR AND HORIZONTAL ADJUSTING BAR

[76] Inventor: Wayne E. Deville, 220 Estate Dr., Pineville, La. 71360

[21] Appl. No.: 538,739

[22] Filed: Oct. 3, 1995

[51] Int. Cl.⁶ .................................................. F16K 3/30
[52] U.S. Cl. .................. 137/486; 137/552; 251/129.04; 251/206; 251/329
[58] Field of Search .................................. 137/315, 486, 137/552, 557; 251/129.04, 206, 329

[56] References Cited

U.S. PATENT DOCUMENTS

| | | | |
|---|---|---|---|
| 2,314,152 | 3/1943 | Mallory | 137/153 |
| 3,000,608 | 9/1961 | Williams | 251/329 X |
| 3,294,112 | 12/1966 | Watkins | 137/494 |
| 3,776,249 | 12/1973 | Wailes | 137/14 |
| 4,364,409 | 12/1982 | Jones | 137/486 |
| 4,579,143 | 4/1986 | Rollins | 137/625.48 |
| 4,693,452 | 9/1987 | Jandrasi | 251/329 |
| 4,790,514 | 12/1988 | Marks | 251/129.03 |
| 4,838,310 | 6/1989 | Scott et al. | 137/624.14 |
| 5,148,829 | 9/1992 | Deville | 137/486 |

*Primary Examiner*—Stephen M. Hepperle
*Attorney, Agent, or Firm*—John M. Harrison

[57] ABSTRACT

A multi-orifice plate carrier for use in a modified orifice fitting and a differential pressure-operated, mechanical valve and piston system for vertically and horizontally adjusting the multi-orifice plate carrier to facilitate recordation of various line pressures on an appropriate recording meter. In a preferred embodiment two or more pressure recording meters are fitted with corresponding meter valves and a common pressure selector valve, along with a spring-loaded or fluid-operated plate piston connected to the multi-orifice plate carrier and a horizontal adjusting bar engaging the plate piston rod, to facilitate vertical adjustment of the multi-orifice plate carrier, horizontal shifting of the orifice plate carrier and resulting alignment of an orifice of selected diameter in the line bore of the orifice and reading of a corresponding recording meter responsive to automatic operation of the pressure selector valve and meter valves. Fully automatic vertical adjustment of the multi-orifice plate carrier may be effected by implementing a remote, radio-operated transceiving unit to actuate a pneumatic switching valve and actuate the pressure selector valve and plate piston.

21 Claims, 4 Drawing Sheets

MULTI-ORIFICE PLATE CARRIER AND FITTING WITH POSITIONER, DIFFERENTIAL SELECTOR AND HORIZONTAL ADJUSTING BAR

BACKGROUND OF THE INVENTION

1. Field of the Invention

This invention relates to orifice fittings for measuring the flow of fluids, including oil, gas, water and slurries in pipelines. More particularly, the invention includes apparatus for vertical and horizontal alignment of selected orifice plates and orifices mounted in a multi-orifice plate carrier in a flow line bore, which orifice plate carrier is located in a specially designed orifice fitting and coupled to a plate positioning and differential selector mechanism for automatically mechanically adjusting the multi-orifice plate carrier vertically inside the orifice fitting by pressure differential. A horizontal adjusting bar is slidably seated in the lower orifice plate housing and is connected to the orifice plate piston to facilitate manual horizontal adjustment of the multi-orifice plate carrier and a selected orifice plate and orifice in the line bore. Recording meters are also provided, each having an appropriate scale for reading and recording the differential pressure across the respective orifices and orifice plates in the multi-orifice plate carrier, responsive to operation of the plate positioning and differential selector mechanism.

Conventional orifice fittings facilitate removal of orifice plates having a single orifice from the line bore of the orifice fitting without terminating flow of the fluid through the pipeline. These orifice fittings are typically provided with dual chambers which allow the orifice plates to be removed safely and conveniently in a pressurized pipeline without reducing or terminating the pressure in the pipeline. Removal and replacement of the respective single orifice plates to effect alignment of an orifice of appropriate size in the fluid flowing through the pipeline is typically effected by operation of a rack-and-pinion-operated, stainless steel slide valve which, when closed, separates the dual chambers in the orifice chambers. The slide valve cannot be closed unless the orifice is properly located in the upper chamber of the orifice fitting and the valve may be easily opened and closed from outside the orifice fitting to effect the desired orifice plate change. Other conventional orifice fittings include single chamber fittings and both the single and dual chamber orifice fittings require periodic removal and replacement of the respective orifice plates to facilitate presentation of an orifice of selected size in the line bore and compensate for pressure fluctuations of the fluid in the pipeline in which the orifice fitting is mounted.

2. Description of the Prior Art

Typical of the single and dual chamber orifice fittings known in the art are the "Superior" (trademark) orifice fitting marketed by Superior Measuring Equipment Company of Houston, Tex.; "C-E Invalco Master Orifice Fittings" (trademark) marketed by Combustion Engineering of Tulsa, Okla.; "Peco" (trademark) orifice fittings marketed by Perry Equipment Corporation of Mineral Wells, Tex.; and "Daniel" (trademark) orifice fittings marketed by Daniel Industries, Inc., of Houston, Tex. The orifice fittings marketed by these companies are characterized by single and dual chamber designs, as described above.

My U.S. Pat. No. 5,148,829, dated Sep. 22, 1992, details a Multi-Orifice Plate and Fitting With Postioner and Differential Selector. The multi-orifice plate is designed for use in a modified orifice fitting and a differential pressure-operated mechanical valve and piston system for vertically adjusting the multi-orifice plate to facilitate recordation of various line pressures on an appropriate recording meter. In a preferred embodiment two or more pressure recording meters are fitted with corresponding meter valves and a common pressure selector valve, along with a spring-loaded plate piston connected to the multi-orifice plate to facilitate operation of the plate piston and vertical shifting of the orifice plate, alignment of an orifice of selected diameter in the line bore of the orifice fitting and reading of a corresponding recording meter, responsive to automatic operation of the pressure selector valve and meter valves. Fully automatic adjustment of the multi-orifice plate may be effected by implementing a remote, radio-operated transceiving unit to actuate a pneumatic switching valve and actuate the pressure selector valve at plate piston. U.S. Pat. No. 2,314,152, dated Mar. 16, 1943, to R. L. Mallory, details a "Control Instrument" which may be used to determine and control the ratio of the flow of a fluid through one conduit with respect to the flow through another conduit. The instrument includes a measuring element, a control device operated by the measuring element, a control point adjusting device for the control device to adjust the value at which the instrument will maintain a condition and a pneumatic unit to adjust the control point adjusting device. The improvement includes a pressure-responsive member operated independently of the control device, levers operated by the control device and a device to change the response of the levers for a given movement of the pressure-responsive member. A "Remotely Operable Fluid Control Valve" is detailed in U.S. Pat. No. 3,294,112, dated Dec. 27, 1966, to B. J. Watkins. The control valve includes a main valve body having a main fluid flow passage and a gate-receiving passage normal to and intersecting the main flow passage. The valve body is adapted to be connected into a fluid flow line in fluid communication with the flow of the fluid in the line. A gate device is slidably mounted in the gate-receiving passage and is arranged to move normal to and through the main passage. Multiple, axially spaced orifices of different size are arranged on the gate device to be successively aligned with the main passage. By selectively placing a fixed sized orifice in the main passage of the valve, a predetermined fluid flow can be obtained from the well. A control device is provided for selectively operating the valve to place the various orifices in the main passages. U.S. Pat. No. 3,776,249, dated Dec. 4, 1973, to Rodney A. Wailes, et al, details a "Pipeline Flow Control System and Method" having multiple power-operated valves located a substantial distance apart. The method continuously monitors pressure conditions at each valve and senses abnormal pressure conditions indicative of a line break. When such abnormal pressure conditions occur, the valves on opposite sides of the break automatically close. Pressure sensing continues and after certain predetermined pressure requirements are met, the valves are automatically opened. Where the system includes looped or parallel branch lines connected at their ends to upstream and downstream portions of the main lines, valves in both branch lines and also adjacent valves in the main line may close, after which, all of the valves will be automatically opened except the valves that isolate the break. U.S. Pat. No. 4,364,409, dated Dec. 21, 1982, to James S. Jones, details a "Fluid Flow Control Device". A metering apparatus is disposed in a conduit for control of the flow of fluid. A throttle piston is movable into and out of the conduit device and is responsive to the flow of fluid for maintaining a constant pressure drop across the metering device for any given setting of the metering device. The metering device includes a pierced cylindrical valve body rotatable on an axis transversed to the axis of a conduit device with two scale index structures attached thereto for indicating adjustment of flow rates appropriate to either of the two source pressures. U.S. Pat. No. 4,579,143, dated Apr. 1, 1986, to Marvin J. Rollins, et al., details a "Control and Purge Valve for Atomization of Heavy Fuel Oil for Combustion". The device is operable between closed, purging and open positions and includes an elongated valve body having a disk carrier disposed therein. The disk carrier preferably includes multiple closure and orifice devices for opening or closing an internally disposed steam exit, steam bypass exit and all exit ports to effect the closed purging and open positions of the valve of the invention. A "Remote Control Valve Operator" is detailed in U.S. Pat. No. 4,790,514, dated Dec. 13, 1988, to Harold L. Marks. The valve manipulating apparatus includes a support assembly having one end releasably attachable adjacent to a pipeline valve and another end supporting a longitudinally shiftable actuating assembly. A remotely excited, bi-directional motor in the actuating assembly engages the stem of the valve and is operable to alternately open and close the valve by rotating the valve. As the valve is manipulated, its stem either extends or retracts and during this movement and a coupler on the motor shaft follows the valve stem displacement and produces a corresponding displacement of the actuating assembly. Switch devices on the actuating assembly cooperate with adjustable stop elements carried by the support assembly to provide for automatic stopping of the motor operation at prescribed points. U.S. Pat. No. 4,838,318, dated Jun. 13, 1989, to George R. Scott, et al, details a "Hydroelectrically Powered, Remotely-Controlled Irrigation System". In the system an impeller is positioned within the flow of a fluid to be used to irrigate an area. The impeller drives a generator which operates the charge and sustains a storage battery. The battery powers a receiver having an identification code by which the receiver may be addressed to receive command such as, for example, to open or close a valve, thereby providing fluid to irrigate an area. By opening the valve, the fluid flow is increased and more power is generated and stored in the battery. In this way, power is generated automatically for the receiver which, in turn, controls the fluid flow for irrigation.

It is an object of this invention to provide a new and improved orifice plate fitting which is designed to receive a novel vertically and horizontally-adjustable multi-orifice plate carrier and a companion positioner and differential selector system for automatically sensing changing pressure conditions in the line bore of the orifice fitting, changing orifice sizes by vertical orifice plate carrier adjustment in the orifice fitting and selecting a recording meter having an appropriate recording scale for recording differential fluid pressure across the orifice located in the line bore of the orifice fitting.

Another object of this invention is to provide a new and improved multi-orifice plate carrier and fitting having a mechanical, valve-operated positioner, a differential selector mechanism, and a multi-orifice plate vertical adjusting mechanism, as well as a horizontal adjusting bar, for vertically and horizontally adjusting the multi-orifice plate and carrier, mounted in a modified orifice fitting to present the proper orifice precisely normal to the fluid flow stream for pressure measurement by a recording meter having a scale corresponding to the pressure differential of the fluid flowing through the orifice and line bore of the orifice fitting.

Still another object of this invention is to provide a multi-orifice plate carrier for vertical and adjustable mounting in a specially designed orifice fitting and a pressure selector valve, meter valves, recording meter or meters and plate piston coupled to the multi-orifice plate carrier, wherein the pressure selector valve operates to sense a change in pressure of the fluid flowing through the line bore of the orifice fitting, and in connection with the meter valves, the plate piston facilitates vertical adjustment of the multi-orifice plate carrier and orifice plate alignment to vertically position an orifice of selected size in the line bore. A horizontal adjusting bar connected to the plate piston facilitates manual horizontal adjustment of the plate piston and orifice fitting to align the orifice precisely in the line bore normal to the flow of fluid through the line bore.

SUMMARY OF THE INVENTION

These and other objects of the invention are provided in a multi-orifice plate carrier which is both vertically and horizontally slidably adjustable in an elongated orifice fitting and is connected to a pressure-operated plate piston and operating assembly. Further included is a pressure selector valve, meter valve and recording meter system designed to sense pressure fluctuations in the line bore of the orifice fitting due to variations in the flow of fluid through the line bore for vertically adjusting the multi-orifice plate carrier in the orifice fitting to orient an orifice of appropriate size in the flow stream of the line bore and select a recording meter having a recording range corresponding to the differential pressure of the fluid flowing through the orifice. A horizontal adjusting bar engages the plate piston for effecting manual horizontal adjustment of the plate piston and attached multi-orifice plate carrier to position the desired orifice normal to the fluid flow.

BRIEF DESCRIPTION OF THE DRAWINGS

The invention will be better understood by reference to the accompanying drawings, wherein.

DESCRIPTION OF THE PREFERRED EMBODIMENTS

Figure 1:
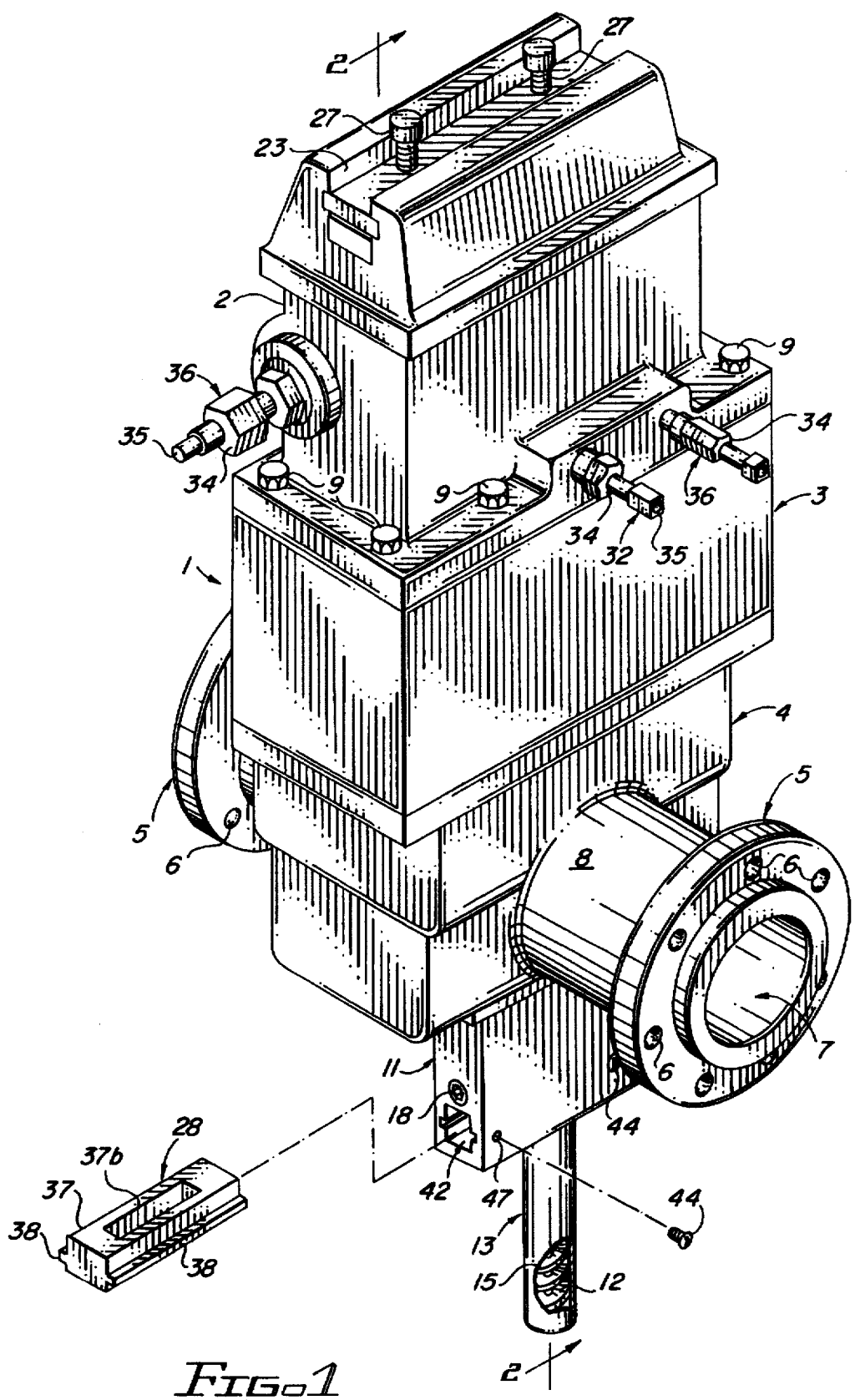
FIG. 1 is a perspective, partially exploded view of a preferred embodiment of an orifice fitting for accommodating the multi-orifice plate carrier of this invention, including a horizontal adjusting bar slidably disposed in the orifice fitting lower housing and a spring-operated cylinder for horizontal and vertical plate carrier adjustment.
Figure 2:
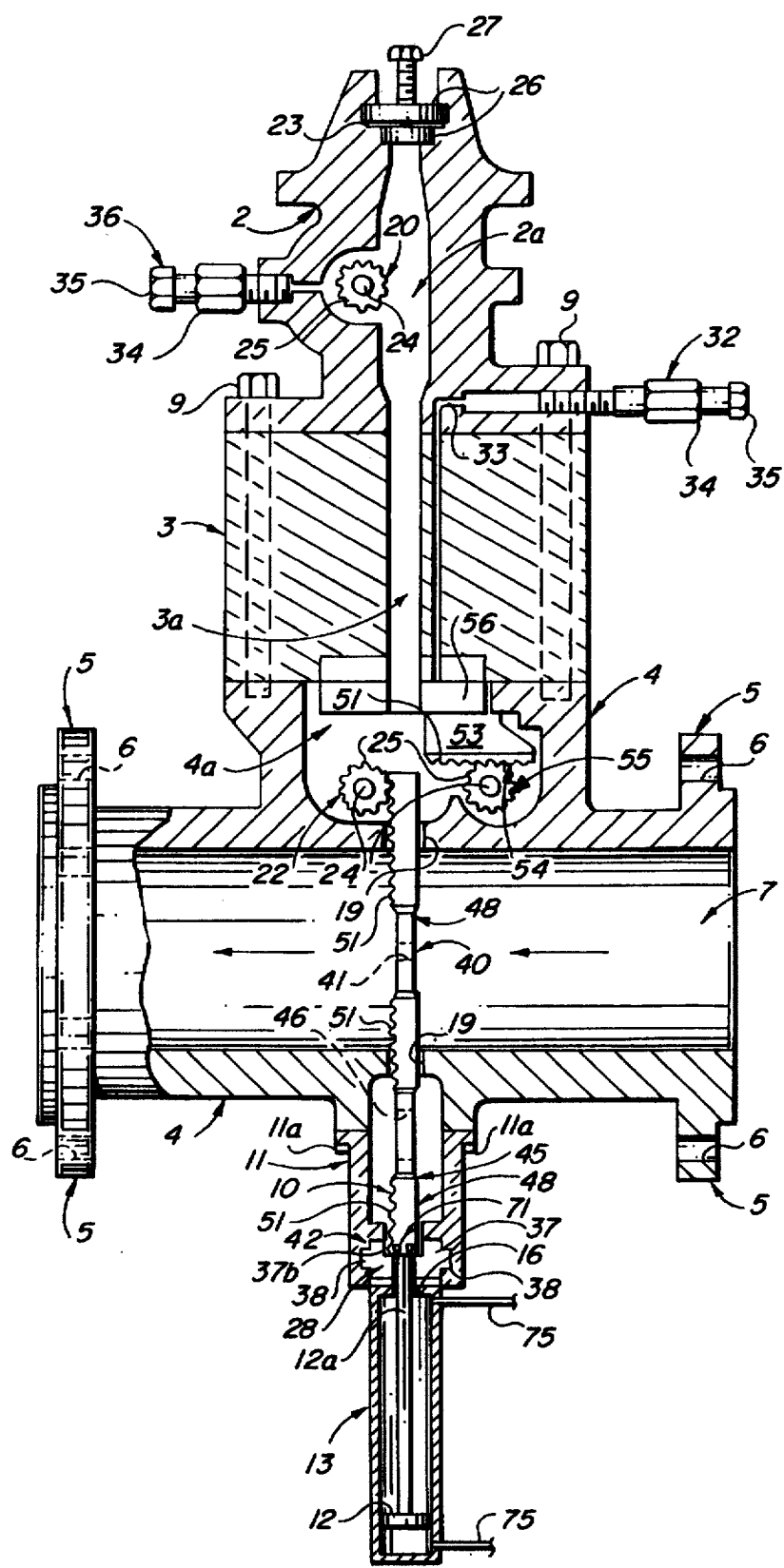
FIG. 2 is a sectional view taken along 2—2 of the orifice fitting illustrated in FIG. 1, with the plate position assembly rotated 90 degrees for clarity and more particularly illustrating the horizontal adjusting bar and a fluid-operated cylinder in place of the spring-operated cylinder illustrated in FIG. 1.
Figure 4:
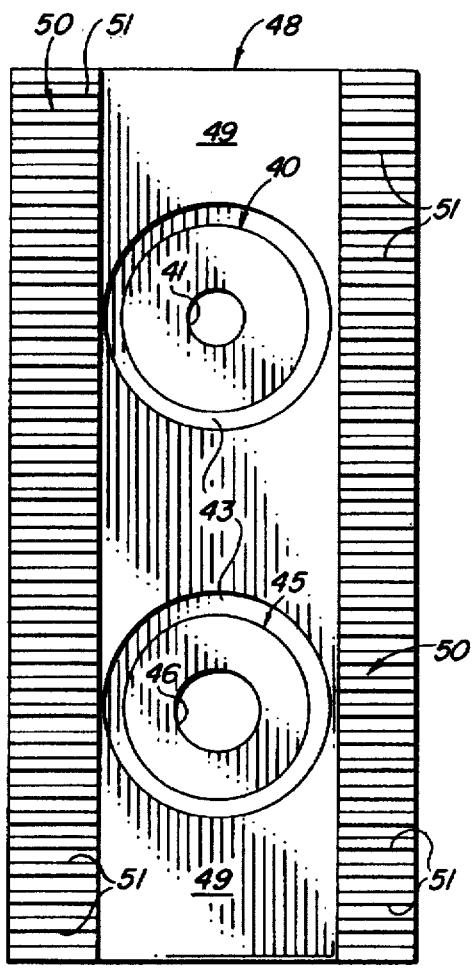
FIG. 4 is a front view of a typical multi-orifice plate carrier embodiment of this invention.

Referring initially to FIGS. 1 and 2 of the drawings, a multi-orifice plate fitting, modified or constructed according to the requirements of this invention, is generally illustrated by reference numeral 1. The multi-orifice plate fitting 1 is characterized by an upper housing 2, provided with an internal upper housing chamber 2a, a housing extension 3, having a vertical housing extension chamber 3a therein communicating with the upper housing chamber 2a and a lower housing 4, provided with an internal lower housing chamber 4a, which communicates with the housing extension chamber 3a and the upper housing chamber 2a, as illustrated in FIG. 2. A pair of housing flanges 5 may be provided on the flange necks 8 of the lower housing 4 for securing the multi-orifice plate fitting 1 into position in a pipeline (not illustrated). However, it will be appreciated by those skilled in the art that alternative connecting devices such as weld neck flanges and the like, may be provided on the flange neck 8 for pipeline connecting purposes, according to the knowledge of those skilled in the art. Under circumstances Where the housing flanges 5 are utilized to connect the multi-orifice plate fitting 1 to a pipeline, spaced flange bolt openings 6 are provided in the housing flanges 5 for receiving flange bolts (not illustrated) and effectuating the proper connection in conventional fashion. A line bore 7 extends from each of the housing flanges 5 through the flange necks 8 and lower housing 4 and a rectangular plate carrier 48, illustrated in FIG. 4, is vertically disposed in a pair of aligned housing slots 19, provided in the lower housing 4 and projects transversely through the line bore 7, as further illustrated in FIG. 2. Upper housing bolts 9 serve to bolt the upper housing 2 to the lower housing 4 and a lower housing extension 11 is bolted to the lower portion of the lower housing 4 by means of extension bolts 11a. The internal lower extension chamber 10 receives the lower end of the plate carrier 48, which projects from the lower housing chamber 4a through the housing slots 19 and the line bore 7 and into the lower extension chamber 10, as further illustrated in FIG. 2. This vertical orientation of the plate carrier 48 in the multi-orifice plate fitting 1 and transversely in the line bore 7 centers a top orifice plate 40, having a top orifice plate 41, also transversely in the line bore 7, such that fluid flowing through the line bore 7 in the direction of the arrows illustrated in FIG. 2 also flows through a top orifice 41 located in the top orifice plate 40, thereby creating a pressure differential across the top orifice plate 40, from the upstream to the downstream side of the top orifice plate 40. This pressure differential is measured by a recording meter to determine the flow rate of the fluid inside the line bore 7, as hereinafter further described.

Figure 6:
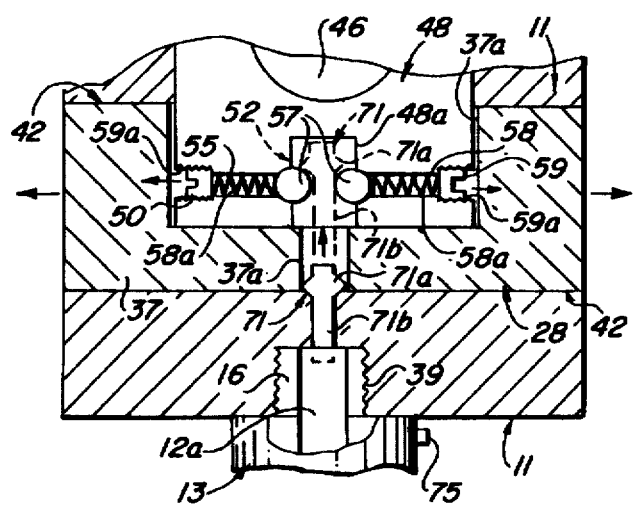
FIG. 6 is a sectional view of a preferred embodiment of the horizontal adjusting bar and cooperating rod locking mechanism for effecting horizontal adjustment of the plate orifices in the fluid flow line bore.

As further illustrated in FIGS. 1, 2 and 6, a pair of clamping and sealing bars 26 are seated in a housing slot 23 and a pair of set screws 27 are threaded into the top one of the clamping and sealing bars 26 in conventional fashion to facilitate removal of the plate carrier 48 from the multi-orifice plate fitting 1, as hereinafter described. Furthermore, a cylinder 13 is mounted on the lower housing extension 11 as hereinafter described and a piston 12 is slidably mounted inside the cylinder and is fitted to one end of a piston rod 12a, which projects through the center of a piston spring 15, disposed in the cylinder 13, as illustrated in FIG. 1. The piston rod 12a projects upwardly through the threaded cylinder neck 16 of the cylinder 13, which threaded cylinder neck 13 is threaded into a threaded cylinder neck receptacle 39 of the lower housing extension 11. A piston access opening 37a is provided in the bar segment 37 of a horizontal adjusting bar 28, horizontally adjustable in the lower housing extension 11 of the lower housing 4, as illustrated in FIGS. 2 and 6. A pair of segment flanges 38 extend from the bar segment 37 as illustrated in FIGS. 1 and 6 and the segment flanges 38 slidably engage corresponding slot segments provided in an adjusting bar slot 42, horizontally oriented in the lower housing extension 11, as further illustrated in FIGS. 1 and 6. Bar set screws 44, illustrated in FIG. 1, seat in threaded set screw apertures 47 in the lower housing extension 11 and selectively engage and disengage the segment flanges 38 to facilitate selective manual slidable adjustment of the horizontal adjusting bar 28 in the adjusting bar slot 42. As further illustrated in FIG. 1, a drain plug 18 drains the lower housing extension 11 and a piston spring 15 is provided inside the cylinder 13 to engage the piston 12, positioned beneath the piston spring 15, and bias the piston 12 and piston rod 12a upwardly, as hereinafter further described. Alternatively, the piston 12 can be operated either as a single-action or double-action piston, by means of an operating fluid such as air, which is selectively pumped into the cylinder 13 through the air conduits 75, in a mechanical configuration illustrated in FIG. 2 and as further hereinafter described. As further illustrated in FIG. 6, a rod locking mechanism 52 serves to connect the extending end of the piston rod 12a to the bottom of the plate carrier 48, by means of a piston lock pin 71, having an enlarged pin head 71a and a pin shaft 71b, the latter threaded into or otherwise connected to the piston rod 12a. The rod locking mechanism 52 also includes a carrier slot 48a, provided in the plate carrier 48 to accommodate the piston lock pin 71 and a pair of horizontal spring bores 58, also provided in the plate carrier 48 normal to the carrier slot 48a, for receiving a pair of tension springs 58a and tension bearings 57. A corresponding pair of tension screws 59 are threaded in the spring bores 58 for selectively tensioning the tension bearings 57 against the pin shaft 71b of the piston lock pin 71 as illustrated in phantom in FIG. 6. The bottom end of the plate carrier 48 projects into a carrier access slot 37b, provided in the bar segment 37, as illustrated in FIG. 6.

Figure 3:
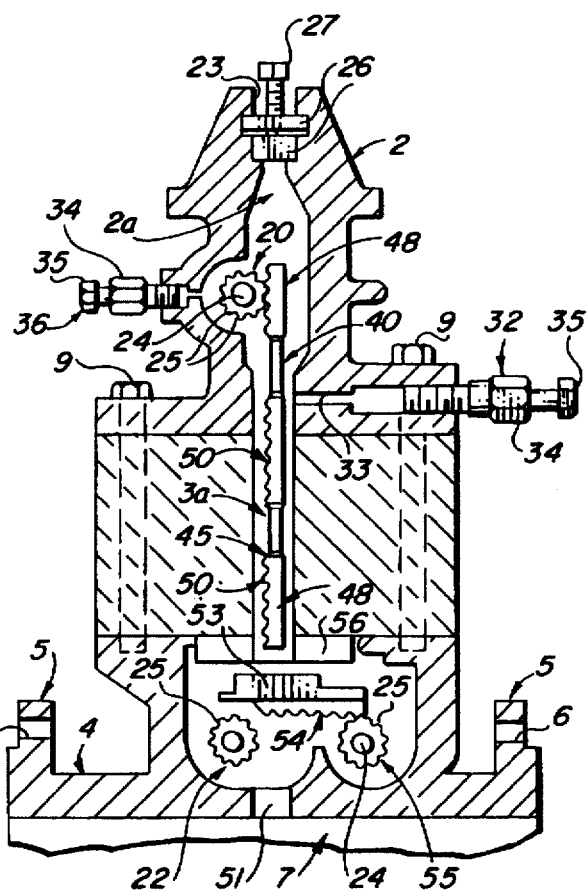
FIG. 3 is a sectional view of the upper portion of the orifice fitting illustrated in FIG. 1, more particularly illustrating vertical adjustment of the multi-orifice plate carrier for removal from the orifice fitting.

As further illustrated in FIGS. 1–4, an equalizer valve 32 is seated in a stuffing box 34, mounted in the upper housing 2 of the multi-orifice plate fitting 1 and communicates with an equalizer passage 33, which extends into communication with the lower housing chamber 4a. A valve stem 35 facilitates opening and closing the equalizer valve 32. A grease fitting 36 is also provided in the upper housing 2, as illustrated and an upper carriage pinion 20 is mounted on a pinion shaft 24 and is located in the upper housing chamber 2a of the upper housing 2 for removing the plate carrier 48 from the multi-orifice plate fitting 1, as hereinafter further described. It will be appreciated by those skilled in the art that the pinion shaft 24 which carries the upper carriage pinion 20 extends through a stuffing box (not illustrated) provided in the upper housing 2 and is fitted for connection to a crank or other apparatus (not illustrated), for rotating the upper carriage pinion 20 and upper carriage pinion 20, as hereinafter further described. A lower carriage pinion 22 is also mounted on a pinion shaft 24, which projects through a similar stuffing box (not illustrated) located in the lower housing 4 and is fitted for connection to a similar crank (not illustrated) for the same purpose. The lower carriage pinion 22 is positioned immediately adjacent to the upper portion of the plate carrier 48, with one of the rack segments 50 which borders the center panel 49 of the carrier 48, located in meshing contact with the pinion teeth 25 of the lower carriage pinion 22. Accordingly, rotation of the pinion shaft 24 and lower carriage pinion 22 in the counterclockwise direction as indicated by the arrow, causes an upward movement of the plate carrier 48 through the line bore 7 and housing slots 19 and inside the lower extension chamber 10, lower housing chamber 4a, and housing extension chamber 3a, to facilitate location of the plate carrier 48 primarily in the housing extension chamber 3a and upper housing chamber 2a, as hereinafter further described. A slide valve pinion 55 is similarly mounted on another pinion shaft 24 and is located in the lower housing chamber 4a of the lower housing 4 in spaced relationship with respect to the lower chamber pinion 22, in conventional relationship. The rack teeth 51 of a slide valve rack 54, located on the bottom of a slide valve 53, also disposed in the lower housing chamber 4a, mesh with the pinion teeth 25 of the slide valve pinion 55. The slide valve 53 is, in turn, conventionally slidably mounted on a slide valve mount 56, which forms a part of the upper portion of the lower housing 4, to facilitate sliding movement of the slide valve 53 from the position illustrated in FIG. 2, where there is continuity of the opening which defines the housing extension chamber 3a and the lower housing chamber 4a, to a position closing the housing extension chamber 3a from the lower housing chamber 4a. This sliding movement of the slide valve 53 is effected by rotation of the pinion shaft 24, which receives the slide valve pinion 55, and the pinion shaft 24 projects through a stuffing box (not illustrated) in the lower housing 4 and receives a crank or other mechanism (not illustrated) for rotating the slide valve pinion 55 in conventional fashion, as described above. Vertical upward movement of the plate carrier 48 is similarly effected, first by operation of the lower carriage pinion 22 and then by rotation of the upper carriage pinion 20, when the top end of the plate carrier 48 and a rack segment 50 reaches the upper carriage pinion 20, as illustrated in FIGS. 2 and 3. As illustrated in FIG. 4, the plate carrier 48 is typically fitted with a top orifice plate 40, having a top orifice 41, and a bottom orifice plate 45, provided with a larger bottom orifice 46. Both the top orifice plate 40 and bottom orifice plate 45 are mounted on the plate carrier 48 by means of a rubber gasket or plate mount 43. The parallel, dual rack segments 50 are designed to selectively contact the pinion teeth 25 of the lower carriage pinion 22 and upper carriage pinion 20, depending upon the relative location of the latter.

Figure 5:
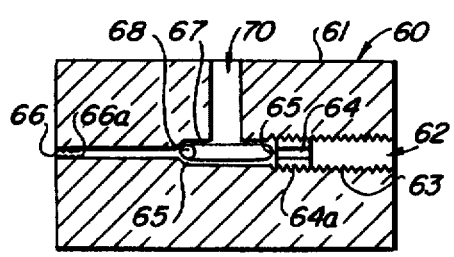
FIG. 5 is a sectional view of a typical meter valve used in the multi-orifice plate carrier positioning and differential pressure selecting system of the invention.
Figures 7, 8:
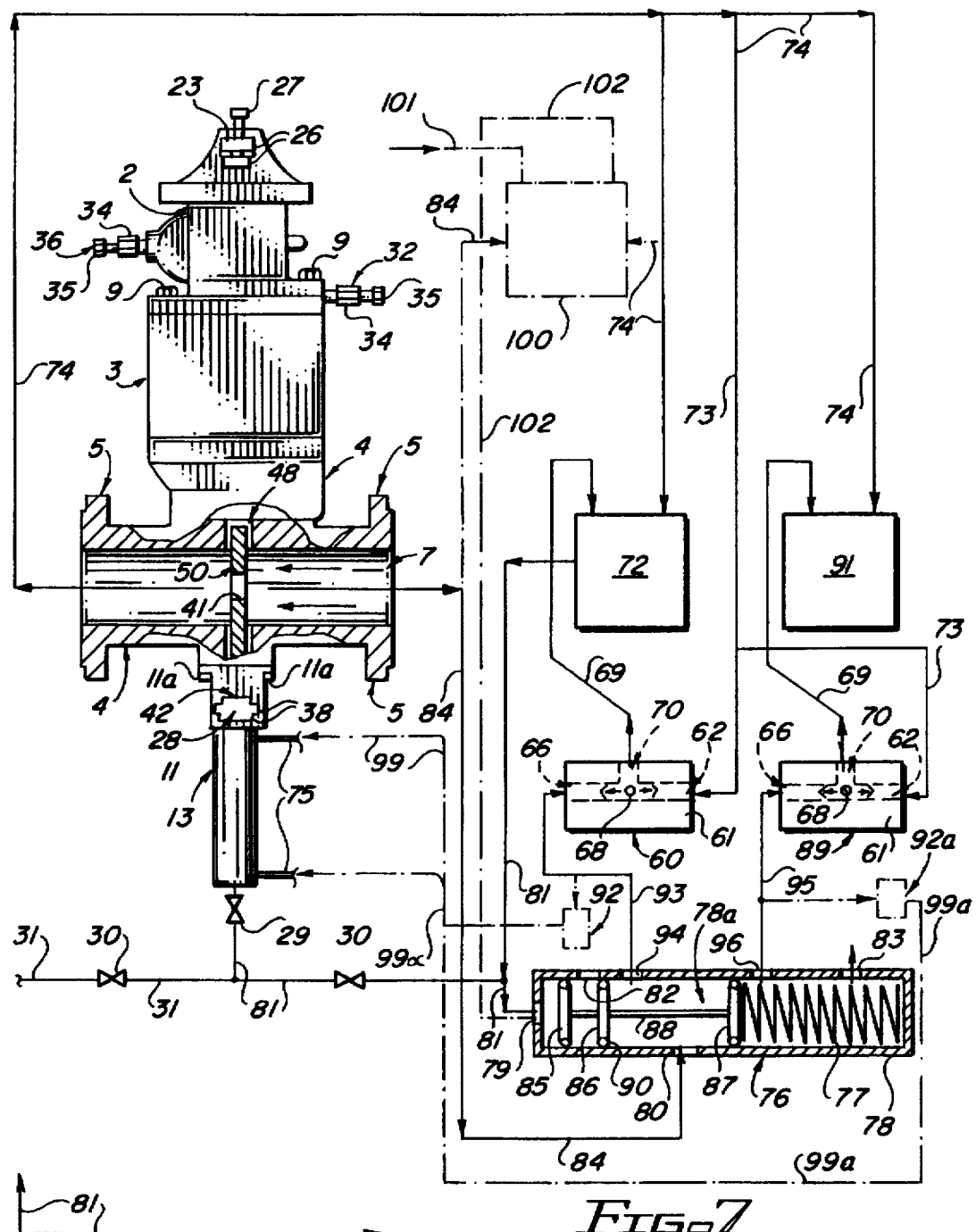
FIG. 7 is a front view, partially in section, of the orifice fitting illustrated in FIG. 1 and a schematic of the multi-orifice plate carrier positioning and differential pressure selecting system coupled to the multi-orifice plate cylinder located in functional position on the orifice fitting.
FIG. 8 is a schematic of an alternative radio-operated system for remotely operating the multi-orifice plate carrier and fitting with positioning and differential pressure selecting system of this invention.

Referring now to FIGS. 5 and 7 of the drawings, the mechanism for mechanically selecting a proper recording meter for recording pressure differentials across the top orifice 41, located in the line bore 7 of the multi-orifice plate fitting 1, and the bottom orifice 46, when the plate carrier 48 is shifted, includes a pressure selector valve 76, a first meter valve 60 and a second meter valve 89, both of the latter of which are connected by fluid pressure lines to the high and low pressure sides of the top orifice plate 40, for monitoring the fluid pressure fluctuation across the top orifice plate 40, as hereinafter further described. In a preferred embodiment the first meter valve 60 and second meter valve 89 are structured as illustrated in FIG. 5, where the first meter valve 60 is shown for purposes of illustration. The first meter valve 60 and second meter valve 89 each include a valve housing 61, having a valve low pressure inlet 62 fitted with internal inlet threads 63 and an inlet plug 64 threadably inserted in the valve low pressure inlet 62 and having a ball seat 65 on the inwardly facing end thereof, as illustrated. A valve high pressure inlet 66 is provided in the opposite side of the valve housing 61 from the valve low pressure inlet 62 and is also provided with a ball seat 65, which is spaced from and faces the ball seat 65 provided in the inlet plug 64. A cylindrical, open-ended ball chamber 67 is positioned between the ball seat 65 and a ball 68 is located in the ball chamber 67, with freedom to roll to and from each ball seat 65. An opening (not illustrated) is provided in the upper middle portion of the cylindrical ball chamber 67, which opening communicates with a valve differential pressure outlet 70, located in the top portion of the valve housing 61 and communicates with the top opening in the ball chamber 67, as further illustrated in FIG. 5.

Referring now to FIG. 7 of the drawings, the pressure selector valve 76 is characterized in a most preferred embodiment by a cylindrical selector valve housing 78, having closed ends and a hollow housing interior 78a. A valve spring 77 is located in one end of the housing interior 78a and is constrained to remain in position by a differential pressure selector valve piston 87, rigidly mounted on one end of a selector valve piston rod 88. A middle selector valve piston 86 is spaced from the differential pressure selector valve piston 87 and is rigidly attached to the selector valve piston rod 88 and a low pressure selector valve piston 85 is spaced from the middle selector valve piston 86 and is similarly rigidly mounted on the opposite end of the selector valve piston rod 88. Accordingly, it will be appreciated from a consideration of FIG. 7 that the low pressure selector valve piston 85, middle selector valve piston 86 and differential pressure selector valve piston 87 are constrained to remain in spaced relationship with respect to each other responsive to movement with the selector valve piston rod 88, since they are rigidly mounted on the selector valve piston rod 88 in the illustrated dissimilarly spaced relationship. A sealing ring 90 may be provided on the outer peripheral circumference of each of the low pressure selector valve piston 85, middle selector valve piston 86 and differential pressure selector valve piston 87 for sealing purposes, according to the knowledge of those skilled in the art. A low pressure inlet port 79 is provided in one end of the selector valve housing 78 and communicates with the housing interior 78a in a space between the low pressure selector valve piston 85 and the end wall of the selector valve housing 78, as illustrated. A high pressure inlet port 80 is provided in the cylindrical wall of the selector valve housing 78 and communicates with the housing interior 78a in a space between the middle selector valve piston 86 and the differential pressure selector valve piston 87. Furthermore, a first meter vent 82 is provided in the cylindrical wall of the selector valve housing 78 and communicates with the housing interior 78a in the space between the low pressure selector valve piston 85 and the differential middle selector valve piston 86. Similarly, a second meter vent 83 is provided in the cylindrical wall of the selector valve housing 78 spaced from the first meter vent 82 and communicates with that space in the housing interior 78a which receives and accommodates the valve spring 77. A first meter differential pressure outlet 94 is located in the cylindrical wall of the selector valve housing 78 substantially opposite the high pressure inlet port 80 in the housing interior 78a space between the middle selector valve piston 86 and the differential pressure selector valve piston 87. A second meter differential pressure outlet 96 is provided in the cylindrical wall of the selector valve housing 78, spaced from the second meter vent 83, and also communicates with that portion of the housing interior 78a which accommodates the valve spring 77. The first meter valve 60 and second meter valve 89 are each internally configured as illustrated in FIG. 5 and are positioned for attachment to the pressure selector valve 76 as follows: The first meter valve 60 is connected to the pressure selector valve 76 by means of a first meter differential pressure feed line 93, which extends from the first meter differential pressure outlet 94 in the pressure selector valve 76, to the valve high pressure inlet 66 of the first meter valve 60. The second meter valve 89 is attached to the pressure selector valve 76 by a second meter differential pressure feed line 95, extending from the second meter differential pressure outlet 96 in the pressure selector valve 76, to the valve low pressure inlet 62 of the second meter valve 89. The first meter valve 60 and second meter valve 89 are also connected to the low pressure side of the top orifice 41, disposed in the top orifice plate 40, located in the line bore 7 of the lower housing 4, by means of a valve low pressure line 73, which communicates with the valve low pressure inlet 62 of each of the first meter valves 60 and the second meter valve 89. Similarly, a meter low pressure line 74 also connects the low pressure end of the top orifice 41 to a first recording meter 72 and a second recording meter 91 that are, in turn, connected to the first meter valve 60 and the second meter valve 89 by means of a pair of meter differential pressure lines 69, which extend from the valve differential pressure outlets 70, respectively, of the first meter valve 60 and the second meter valve 89. Accordingly, it will be appreciated from a consideration of FIG. 7 that pressure variations in the upstream, or high pressure side of the line bore 7 with respect to the top orifice 41 are transmitted to the pressure selector valve 76 and from there to the first meter valve 60 and second meter valve 89, to switch the pressure recording operation from the first meter 72 to the second meter 91, as hereinafter further described.

Referring again to FIGS. 1, 2 and 7 of the drawings, vertical adjustment of the plate carrier 48, and thus, the top orifice plate 40 and bottom orifice plate 45, responsive to pressure fluctuations in the fluid flowing in the line bore 7 is accomplished by operation of the cylinder 13. A first meter-selector valve line 81 extends between the first recording meter 72 and the low pressure inlet port 79 of the pressure selector valve 76, to facilitate generation of a pressure signal having a selected magnitude from the first recording meter 72 when a pressure change is first sensed in the line bore 7, as hereinafter further described. This pressure signal generated by the first recording meter 72 is typically about 20 pounds per square inch and is also transmitted to the piston 12 inside the cylinder 13, by means of the first meter-selector valve line 81, as illustrated in FIG. 7. The 20-pound pressure applied to the piston 12 forces the plate piston 12 upwardly inside the cylinder 13 and causes the piston rod 12a to move upwardly, thereby also forcing the plate carrier 48 upwardly, to position the larger bottom orifice plate 45 in the line bore 7 in place of the top orifice plate 40. Precise vertical alignment of the bottom orifice plate 45 normal to the flow of fluid through the line bore 7 is then effected by manual slidable manipulation of the horizontal adjusting bar 28, as hereinafter further described. The new differential pressure across the newly positioned and vertically aligned top orifice 41 in the top orifice plate 40 is then measured and recorded by the second recording meter 91, according to a mechanical sequence which will be hereinafter further described.

In further operation, it will be appreciated by those skilled in the art that shifting of the plate carrier 48 to reposition the top orifice plate 40 and the bottom orifice plate 45 in the line bore 7 is effected by a mechanical sequence which is activated by pressure differential. When the flow of fluid through the line bore 7 is steady, under conditions of substantially constant pressure, the low pressure selector valve piston 85, located in the pressure selector valve 76, is subjected to atmospheric pressure. Consequently, the pressure inside the housing interior 78a of the pressure selector valve 76 is also subjected to atmospheric pressure. Accordingly, the first recording meter 72 records the differential pressure across the top orifice plate 40 plus static, or atmospheric pressure in conventional fashion and the second recording meter 91 is subjected to static or atmospheric pressure only. The differential pressure recorded by the first recording meter 72 is therefore effected by high pressure on the upstream side of the top orifice plate 40 and lower pressure on the downstream side of the top orifice plate 40. When the differential pressure across the top orifice plate 40 increases due to an increase in pressure of the fluid flowing through the line bore 7, this pressure is transmitted to the pressure selector valve 76 at the high pressure inlet port 80 through the high pressure selector valve line 84. The increase in pressure in the housing interior 78a of the pressure selector valve 76 between the middle selector valve piston 86 and the differential pressure selector valve piston 87 causes a pressure increase in the first meter differential pressure feed line 93, connected to the feed meter differential pressure outlet 94 of the pressure selector valve 76. This pressure is then transmitted to the first meter valve 60 through the valve high pressure inlet 66, thereby forcing the ball 68 against the ball seat 65 located in the inlet plug 64, which is threaded in the valve low pressure inlet 62 of the first meter valve 60, as illustrated in FIGS. 5 and 7. The pressure is further transmitted through the valve differential pressure outlet 70 and through the meter differential pressure line 69 to the first recording meter 72. Since the pressure entering the first recording meter 72 is greater than the pressure provided in the first recording meter 72 from the meter low pressure line 74, which communicates with the low pressure side of the top orifice plate 40, the differential pressure in the first recording meter 72 begins to rise, which pressure increase is recorded on a chart (not illustrated). During this period of time, static or atmospheric pressure alone is applied to that portion of the housing interior 78a in the pressure selector valve 76 which contains the valve spring 77, as well as the second meter valve 89 and the second recording meter 91, respectively. Increasing pressure in the first recording meter 72 finally reaches a predetermined point where an output signal of selected magnitude, 20 pounds per square inch, for example, is generated by the first recording meter 72 and this 20 pounds of pressure is transmitted from the first recording meter 72 through the first meter-selector valve line 81 to the housing interior 78a of the pressure selector valve 76, at the low pressure inlet port 79 and simultaneously, to the piston 12 of the cylinder 13. The pressure applied to the piston 12 forces the piston 12 and the piston rod 12a upwardly, either against the bias of the piston spring 15, as illustrated in FIG. 1, or against the pressure of air as an operating fluid introduced into the upper air conduit 75, attached to the cylinder 13, as illustrated in FIGS. 2 and 7. This action also forces the plate carrier 48 vertically upwardly inside the multi-orifice plate fitting 1, until the top orifice plate 40 is located inside the lower housing chamber 4a and the bottom orifice plate 45 is oriented, along with the bottom orifice 46, in the line bore 7 of the lower housing 4. With this action, the simultaneous application of 20 pounds of pressure to the low pressure selector valve piston 85 in the housing interior 78a of the pressure selector valve 76 causes the low pressure selector valve piston 85, middle selector valve piston 86 and differential pressure selector valve piston 87 to move linearly in concert in the housing interior 78a against the bias of the valve spring 77. This relocates the low pressure selector valve piston 85, middle selector valve piston 86 and differential pressure selector valve piston 87 such that the 20 pounds of air pressure in that portion of the housing interior 78a located in the space between the low pressure selector valve piston 85 and the middle selector valve piston 86 is vented to the atmosphere through the first meter vent 82. Accordingly, the pressure located in that portion of the housing interior 78a which is located in the space between the low pressure selector valve piston 85 and the middle selector valve piston 86 is atmospheric pressure only. This location of the low pressure selector valve piston 85, middle selector valve piston 86 and differential pressure selector valve piston 87 against the tension in the valve spring 77 thus sequentially relocates the low pressure selector valve piston 85 and the middle selector valve piston 86 on each side of the first meter vent 82 and the first meter differential pressure outlet 94, thereby blocking application of the line bore high pressure through the high pressure selector valve in line 84 from introduction into the first meter differential pressure outlet 94 and first meter differential pressure feed line 93, to the first meter valve 60. The first meter valve 60 is subjected to low pressure from the low pressure side of the bottom orifice plate 45 and the differential pressure in the first meter valve 60 is therefore reduced to zero, since residual pressure on the high pressure side of the first recording meter 72 is bled through the first meter differential pressure feed line 93 and first meter differential pressure outlet 94, to the first meter vent 82. However, the increased pressure on the high pressure side of the bottom orifice plate 45 is then transmitted from that portion of the housing interior 78a located between the middle selector valve piston 86 and the differential pressure selector valve system 87, through the second meter differential pressure outlet 96, which is now exposed and lies to the left of the differential pressure selector valve piston 87. This line bore high pressure is then transmitted to the second meter valve 89 through the second meter differential pressure feed line 95 at the valve high pressure inlet 66 and the ball 68 is forced against the ball seat 65 lying opposite the inlet plug 64, as illustrated in FIG. 5. This mechanical configuration of the second meter valve 89 facilitates pressurizing of the valve differential pressure outlet 70 of the second meter valve 89 and the second recording meter 91, by means of the meter differential pressure line 69. Since the second meter valve 89 is also subjected to pressure from the low pressure, downstream side of the bottom orifice plate 45, the second recording meter 91 now reads the differential pressure across the bottom orifice plate 45 and bottom orifice 46. This new differential pressure is then measured and recorded by the second recording meter 91, while the first recording meter 72 is not operating. It will be appreciated from a consideration of the mechanical sequence outlined above that if the pressure in the line bore 7 is subsequently reduced, the entire sequence is reversed, whereby the meter measuring and recording operation is switched from the second recording meter 91 to the first recording meter 72 by reversing the steps outlined above.

In each successive positioning of the top orifice 41 and bottom orifice 46 in the line bore 7 as described above, it is highly advantageous to manually adjust the corresponding top orifice plate 40 and bottom orifice plate 45 to a vertical position in the line bore 7, for accuracy in pressure differential across the orifice plates. This is accomplished by loosening the bar set screws 44 in the respective threaded set screw apertures 47 in the lower housing extension 11 and slidably adjusting the horizontal adjusting bar 28 in the adjusting bar slot to adjust the piston rod 12a and the orifice plates to a desired position. The bar set screws 44 are then retightened to hold the selected orifice plate position in the line bore 7.

Referring again to FIGS. 2, 3 and 7 of the drawings, under circumstances where the plate carrier 48 must be removed to insert an alternative plate carrier (not illustrated) having larger or smaller orifices, the first recording meter 72 and second recording meter 91 are initially taken out of service by manipulating conventional valves (not illustrated) in conventional fashion. An isolation valve 29, provided in the first meter-selector valve line 81, is then closed to isolate the cylinder 13 from the rest of the differential pressure control system. A pair of bypass valves 30 are mounted in a bypass valve line 31, which is connected to the first meter-selector valve line 81 that supplies pressurized fluid such as natural gas at a selected pressure, 20 psi, for example, to the cylinder 13. The isolation valve 29 and the bypass valves 30 are then selectively opened, and the piston 12 is forced upwardly in the cylinder 13 to raise the plate carrier 48 in the lower extension chamber 10 and housing extension chamber 3a. This action causes the pinion teeth 25 of the lower carriage pinion 22 to engage the rack teeth 51 of one of the rack segments 50 on the plate carrier 48 and facilitates raising of the plate carrier 48. The piston rod 12a is then disconnected from the lower end of the plate carrier 48 by unthreading the threaded cylinder neck 16 of the cylinder 13 from the lower housing extension 11 and pulling downwardly on the now exposed piston 12 to depress the tension bearings 57 against the tension springs 58a and allow the piston lock pin 71 to disengage the tension bearings 57. The lower carriage pinion 22 can then be operated in conventional manner by a crank handle or the equivalent (not illustrated), to raise the plate carrier 48 from the position illustrated in FIG. 6, nearly to the configuration shown in FIG. 3 of the drawings, where the pinion teeth 25 of the upper carriage pinion 20 engage the rack teeth 51 of one of the rack segments 50. The upper carriage pinion 20 can then be operated in the same manner as the lower carriage pinion 22, to raise the plate carrier 48 to the position illustrated in FIG. 3. The slide valve 53 is then operated in conventional manner by rotation of the slide valve pinion 55 to close the housing extension chamber 3a from the lower housing chamber 4a and the valve stem 35 of a pressure release valve 32, provided on the upper housing 2 as illustrated in FIG. 2, is manipulated to "blow down" or equalize the pressure inside the upper housing 2a and housing extension chamber 3a to atmospheric pressure. The clamping and sealing bars 26 are then removed from the upper housing 2 by removing the corresponding set screws 27 and the plate carrier 48 is removed from the upper housing chamber 2a and housing extension chamber 3a by operation of the upper pinion 20, in conventional fashion. Replacement of the plate carrier 48 by an alternative plate carrier (not illustrated) is effected by reversing this procedure to install the new plate carrier and orifices inside the multi-orifice plate fitting 1 in the configuration illustrated in FIG. 2.

Referring now to FIG. 8 of the drawings, the multi-plate orifice adjustment inside the multi-orifice plate fitting of this invention can be remotely initiated by a radio signal which is received and processed by a remote transceiving unit 97, that operates a pneumatic switching valve 98. This functions in the same manner as the first recording meter 72 pressure signal transmitted through the first meter-selector valve line 81, to the low pressure inlet port 79 of the pressure selector valve 76 and the piston 12 in the cylinder 13. Accordingly, fluid at a predetermined operating pressure, for example 20 psi, is supplied from a suitable source through the bypass line 31 to the pneumatic switching valve 98. When the pneumatic switching valve 98 is energized by the remote transceiving unit 97, the pressure signal is transmitted simultaneously to the pressure selector valve 96 via the low pressure inlet port 79 and the piston 12, in either of the cylinder 13 variations illustrated in FIGS. 1 and 2, and the system operates in the manner described above.

Referring again to FIG. 7 of the drawings the device of this invention can be operated by means of an optional control 100, illustrated in phantom and connected to the low pressure inlet port 79 of the pressure selector valve 76 by means of an optional control output line 102. The optional control 100 is also connected to the line bore 7 of the multi-orifice plate fitting 1 means of the high pressure selector valve line 84. An optional control input line 101 is connected to a valve (not illustrated) on the fluid pipeline (not illustrated) to furnish operating pressure to the optional control 100. Furthermore, as also illustrated in FIG. 7, a first pressure regulator 92 and second pressure regulator 92a may be provided in the system and are illustrated in phantom as optional pieces of equipment. The first pressure regulator 92 is connected to the upper one of the air conduits 75 by means of a first regulator output line 99, also illustrated in phantom. The first pressure regulator 92 is also connected to the first meter differential pressure feed line 93. Similarly, the second pressure regulator 92a has a second regulator output line 99a connected to the lower of the two air conduits 75 and the input to the second pressure regulator 92a is connected to the second meter differential pressure feed line 95, as illustrated. Accordingly, under circumstances where the optional control 100, first pressure regulator 92 and second pressure regulator 92a are placed in service in applicant's system, it will be appreciated that the output pressure from the optional control 100 and extending through the optional control output line 102 to the low pressure inlet port 79 of the pressure selective valve 76 will either be 0 or 20 psi. Furthermore, each of the first pressure regulator 92 and second pressure regulator 92a are designed to reduce the incoming pressure from the pressure selector valve 76 to, in turn, reduce the pressure applied to the respective air conduits 75, as hereinafter further described. Accordingly, when a pressure fluctuation is applied from the multi-orifice plate fitting 1 to the optional control 100 through the high pressure selector valve line 84, if the control 100 is at a pressure of 0 psi, then this 0 pressure condition is applied to the low pressure inlet port 79 of the pressure selector valve 76 and also to the housing interior 78a between the middle selector valve piston 86 and the differential pressure selector valve piston 87. The 0 pressure condition is simultaneously applied to the first meter differential pressure feed line 93 through the first meter differential pressure outlet 94 of the pressure selector valve 76 and thus, to the first pressure regulator 92. The 0 pressure condition is also applied to the valve high pressure inlet 66 of the first meter valve 60 and from the first meter valve 60 into the first recording meter 72 through the meter differential pressure line 69. When the pressure of the fluid flowing through the line bore 7 increases, the optional control outlet signal automatically increases to 20 psi and is applied to the optional control output line 102 by operation of the Optional control 100. This pressure applied to the low pressure selector valve piston 85 causes the low pressure selector valve piston 85, middle selector valve piston 86 and differential pressure selector valve piston 87 to retract in concert against the bias of the valve spring 77 inside the selector valve housing 78 of the pressure selector valve 76. This movement of the pistons closes the high pressure inlet port 80, as the space between the middle selector valve piston 86 and the differential pressure selector valve piston 87 is displaced from the first meter differential pressure outlet 94 and spans the high pressure inlet port 80. Accordingly, pressure from the first meter valve 60 extending through the first meter differential pressure feed line 93 is allowed to exhaust through the first meter vent 82 located in the selector valve housing 78, since the low pressure selector valve piston 85 and middle selector valve piston 86 span the first meter differential pressure outlet 94 and the adjacent first meter vent 82. This condition facilitates a 0 pressure condition in the first pressure regulator 92, since the first pressure regulator 92 is connected to the first meter differential pressure feed line 93. Accordingly, a 0 pressure condition also exists in the top one of the air conduits 75. Since a positive air pressure is now applied to the second meter differential pressure feed line 95 from the high pressure inlet port 80 and the second meter differential pressure outlet 96 in the pressure selector valve 76, that pressure is also applied to the second meter valve 89 and the second pressure regulator 92a and also to the second regulator output line 99a, connected to the lower one of the air conduits 75. This pressure differential applied to the interior of the cylinder 13 causes the cylinder piston 12 to move upwardly and shift the plate carrier 48, as well as the top orifice plate 40 and bottom orifice plate 45, with respect to the line bore 7, as heretofore described.

Referring again to FIG. 7 of the drawings, it will be further appreciated by those skilled in the art that the first pressure regulator 92 and second pressure regulator 92a are optional and may be eliminated in favor of construction of a cylinder 13 which is capable of handling full line pressure from the respective first meter valve 60 and second meter valve 89, directly into the air conduits 75. This connection is facilitated by eliminating the first pressure regulator 92 and second pressure regulator 92a and connecting the first regulator output line 99 directly from the upper one of the air conduits 75 to the first meter differential pressure feed line 93 and the second regulator output line 99a directly from the lower one of the air conduits 75 to the second meter differential pressure feed line 95. It is further understd that the first recording meter 72 and optional control 100 can be combined in a single unit, if so desired.

It will also be appreciated by those skilled in the art that the multi-orifice plate and fitting with positioner, differential selector and horizontal adjusting bar of this invention operates in a purely mechanical way to quickly, easily, effectively and accurately reposition orifice plates and orifices in the line bore of a specially designed orifice plate fitting and switch recording meters to accommodate the current orifice plate and orifice, without the necessity of removing the plate carrier. Furthermore, this mechanical operation requires no elaborate and expensive electronic systems nor power source and is reliable and inexpensive. Moreover, while the system has been described in terms of two orifice plates and orifices of different size in a single plate carrier as illustrated in FIG. 4 of the drawings, it will be appreciated that substantially any number of orifice plates and orifices may be provided in linear spacing in a plate carrier 48, as desired. Under these circumstances, a separate recording meter and meter valve would be required for each additional orifice plate and orifice and each of the recording meters, except the last meter in the pressure sensing sequence, would not require a signal output capability like the 20 pound signal generated by the first recording meter 72, responsive to a pressure increase in the fluid flowing through the pipeline and the line bore 7 of the multi-orifice plate fitting 1. Since, according to the exemplary system illustrated in the drawings, only the first recording meter 72 must be fitted with an output signal for switching the pressure-recording function to the second recording meter 91 responsive to a fluid pressure increase, the second recording meter 91 need not be so fitted. However, if a third recording meter was added to the selector system, it would not require such signal capabilities, although the second recording meter 91 would.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A multi-orifice plate fitting and plate positioning apparatus for mounting in a fluid transmission system and measuring the pressure of fluid flowing in the system, said apparatus comprising housing means, a multi-orifice plate having at least two spaced orifices, said multi-orifice plate adjustably located in said housing means, with one of said orifices disposed in the path of the fluid for defining a high pressure side and a low pressure side in the fluid on each side of said one of said orifices; differential pressure selector means provided in pressure-sensing communication with the fluid on each side of said one of said orifices, for sensing a pressure change across said one of said orifices; plate piston means carried by said housing means in engagement with said multi-orifice plate, said plate piston means provided in pressure-operating communication with said differential pressure selector means; and a horizontal adjusting bar slidably and horizontally disposed in said housing means, said horizontal adjusting bar engaging said plate piston means, whereby said multi-orifice plate is shifted vertically in said housing means to selectively locate said orifices in the path of the fluid, responsive to said pressure change and operation of said differential pressure selector means and said plate piston means and said multi-orifice plate is selectively horizontally shifted in said housing means to horizontally align said orifices in the path of the fluid.

2. The multi-orifice fitting and plate positioning apparatus of claim 1 wherein said housing means comprises an upper housing; upper plate-engaging means provided in the interior of said upper housing for selectively engaging and lifting said multi-orifice plate; a lower housing carried by said upper housing and a line bore provided in the interior of said lower housing for carrying the fluid; lower plate-engaging means provided in the interior of said lower housing for selectively engaging and vertically shifting said multi-orifice plate; and a slide valve slidably mounted in the interior of said lower housing for selectively isolating the interior of said upper housing from the interior of said lower housing and facilitating removal of said multi-orifice plate from said upper housing and said lower housing.

3. The multi-orifice plate fitting and plate positioning apparatus of claim 1 wherein said plate piston means comprises a plate piston cylinder carried by said housing means in fixed relationship; plate piston operating means provided in said plate piston cylinder; a plate piston disposed in said plate piston cylinder in contact with said plate piston operating means; and a piston rod carried by said plate piston, said piston rod engaging said multi-orifice plate, whereby vertical movement of said plate piston and said piston rod responsive to operation of said plate piston operating means shifts said multi-orifice plate vertically in said housing means.

4. The multi-orifice fitting and plate positioning apparatus of claim 1 wherein:
   (a) said housing means comprises an upper housing; upper plate-engaging means provided in the interior of said upper housing for selectively engaging and lifting said multi-orifice plate; a lower housing carried by said upper housing and a line bore provided in the interior of said lower housing for carrying the fluid; lower plate-engaging means provided in the interior of said lower housing for selectively engaging and vertically shifting said multi-orifice plate; and a slide valve slidably mounted in the interior of said lower housing for selectively isolating the interior of said upper housing from the interior of said lower housing and facilitating removal of said multi-orifice plate from said upper housing and said lower housing; and
   (b) said plate piston means comprises a plate piston cylinder carried by said lower housing in fixed relationship; plate piston operating means provided in said plate piston cylinder; a plate piston disposed in said plate piston cylinder in contact with said plate piston operating means; and a piston rod carried by said plate piston, said piston rod engaging said multi-orifice plate, whereby vertical movement of said plate piston and said piston rod responsive to operation of said plate piston operating means shifts said multi-orifice plate vertically in said interior of said upper housing and said lower housing.

5. The multi-orifice fitting and plate positioning apparatus of claim 1 wherein said differential pressure selector means comprises pressure selector valve means provided in pressure-sensing communication with the high pressure side of said one of said orifices; at least two meter valve means provided in pressure-operating communication with said pressure selector valve means and in pressure-sensing communication with the low pressure side of said one of said orifices; and at least two recording meter means provided in pressure-operating communication with said meter valve means, respectively, and in pressure-sensing communication with said low pressure side of said one of said orifices, whereby said recording meter means are selectively operated by said meter valve means, respectively, responsive to energizing of said pressure selector valve means by said pressure change across said one of said orifices.

6. The multi-orifice plate fitting and plate positioning apparatus of claim 5 wherein said housing means comprises an upper housing; upper plate-engaging means provided in the interior of said upper housing for selectively engaging said multi-orifice plate; a lower housing carried by said upper housing and a line bore provided in the interior of said lower housing for carrying the fluid; lower plate-engaging means provided in the interior of said lower housing for selectively engaging and vertically shifting said multi-orifice plate; and a slide valve slidably mounted in the interior of said lower housing for selectively isolating the interior of said upper housing from the interior of said lower housing and facilitating removal of said multi-orifice plate from said upper housing and said lower housing.

7. The multi-orifice plate fitting and plate positioning apparatus of claim 5 wherein said plate piston means comprises a plate piston cylinder carried by said housing means in fixed relationship; plate piston operating means provided in said plate piston cylinder; a plate piston disposed in said plate piston cylinder in contact with said plate piston operating means; and a piston rod carried by said plate piston, said piston rod engaging said multi-orifice plate, whereby vertical movement of said plate piston and said piston rod responsive to operation of said plate piston operating means shifts said multi-orifice plate vertically in said housing means.

8. The multi-orifice plate fitting and plate positioning apparatus of claim 5 wherein:
(a) said housing means comprises an upper housing; upper plate-engaging means provided in the interior of said upper housing for selectively engaging and vertically shifting said multi-orifice plate; a lower housing carried by said upper housing and a line bore provided in the interior of said lower housing for carrying the fluid; lower plate-engaging means provided in the interior of said lower housing for selectively engaging and vertically shifting said multi-orifice plate; and a slide valve slidably mounted in the interior of said lower housing for selectively isolating the interior of said upper housing from the interior of said lower housing and facilitating removal of said multi-orifice plate from said upper housing and said lower housing; and
(b) said plate piston means comprises a plate piston cylinder carried by said lower housing in fixed relationship; plate piston operating means provided in said plate piston cylinder; a plate piston disposed in said plate piston cylinder in contact with said plate piston operating means; and a piston rod carried by said plate piston and said multi-orifice plate, whereby vertical movement of said plate piston and said piston rod responsive to operation of said plate piston operating means shifts said multi-orifice plate vertically in said interior of said upper housing and said lower housing.

9. A multi-orifice plate fitting and plate positioning apparatus for mounting in a pipe and measuring the pressure of fluid flowing in the pipe, said apparatus comprising a housing having a hollow interior and a flow path for accommodating the fluid; a multi-orifice plate having at least two spaced orifices, said multi-orifice plate adjustably and substantially vertically oriented in said hollow interior, with a selected one of said orifices disposed in the flow path of the fluid for defining a high pressure side and a low pressure side in the fluid on each side of said one of said orifices; differential pressure selector means provided in pressure-sensing communication with the fluid on each side of said one of said orifices, for sensing a pressure change across said one of said orifices; plate piston means carried by said housing means in engagement with said multi-orifice plate, said plate piston means provided in pressure-operating communication with said differential pressure selector means; and a horizontal adjusting bar slidably and horizontally disposed in said housing means, said horizontal adjusting bar engaging said plate piston means, whereby said multi-orifice plate is shifted vertically in said housing means to selectively locate said orifices in the path of the fluid, responsive to said pressure change across said one of said orifices and operation of said differential pressure selector means and said plate piston means, and said multi-orifice plate is selectively horizontally shifted in said housing means to horizontally align said orifices in the path of the fluid.

10. The multi-orifice plate fitting and plate positioning apparatus of claim 9 wherein said plate piston means comprises a plate piston cylinder carried by the lower end of said housing in fixed relationship; plate piston operating means provided in said plate piston housing; a plate piston disposed in said plate piston cylinder in contact with said plate piston operating means; and a piston rod carried by said plate piston and engaging said multi-orifice plate, whereby vertical movement of said plate piston and said piston rod responsive to operation of said plate piston operating means shifts said multi-orifice plate vertically in said hollow interior of said housing.

11. The multi-orifice plate fitting and plate positioning apparatus of claim 9 wherein said differential pressure selector means further comprises pressure selector valve means provided in pressure-sensing communication with said high pressure side of said one of said orifices; at least two meter valve means provided in pressure-operating communication with said pressure selector valve means and in pressure-sensing communication with said low pressure side of said one of said orifices; an optional control means provided in pressure-sensing communication with said pressure selector valve means and said high pressure side of said one of said orifices; and at least one recording meter means provided in pressure-operating communication with said meter valve means, respectively, and in pressure-sensing communication with said low pressure side of said one of said orifices, whereby said recording meter means are selectively operated by said meter valve means, respectively, responsive to energizing of said optional control means and said pressure selector valve means by said pressure change across said one of said orifices.

12. The multi-orifice plate fitting and plate positioning apparatus of claim 9 wherein:
(a) said plate piston means comprises a plate piston cylinder carried by the lower end of said housing in fixed relationship; plate piston operating means provided in said plate piston cylinder; a plate piston disposed in said plate piston cylinder in contact with said plate piston operating means; and a piston rod carried by said plate piston and engaging said multi-orifice plate, whereby vertical movement of said plate piston and said piston rod responsive to operation of said plate piston operating means shifts said multi-orifice plate vertically in said hollow interior of said housing; and
(b) said differential pressure selector means comprises pressure selector valve means provided in pressure-sensing communication with said high pressure side of said one of said orifices; at least two meter valve means provided in pressure-operating communication with said pressure selector valve means and in pressure-sensing communication with said low pressure side of said one of said orifices; an optional control means provided in pressure-sensing communication with said pressure selector valve means and said high pressure side of said one of said orifices; and at least one recording meter means provided in pressure-operating communication with said meter valve means, respectively, and in pressure-sensing communication with said low pressure side of said one of said orifices, whereby said recording meter means are selectively operated by said meter valve means, respectively, responsive to energizing of said optional control means and said pressure selector valve means by said pressure change across said one of said orifices; and at least one recording meter means provided in pressure-operating communication with said meter valve means, respectively, and in pressure-sensing communication with said low pressure side of said one of said orifices, whereby said recording meter means are selectively operated by said meter valve means, respectively, responsive to energizing of said pressure selector valve means by said pressure change across said one of said orifices.

13. A multi-orifice plate fitting and plate positioning apparatus for mounting in a pipeline and measuring the pressure of fluid flowing in the pipeline, said apparatus comprising a split housing having a hollow interior and a flow path for accommodating the fluid; a multi-orifice plate having at least two spaced orifices, said multi-orifice plate removably and vertically and horizontally adjustably located in said hollow interior, with one of said orifices transversely disposed in said flow path of the fluid for defining a high pressure upstream side and a low pressure downstream side in the fluid on each side of said one of said orifices; differential pressure selector means provided in pressure-sensing communication with the fluid on the high pressure upstream side of said one of said orifices and the low pressure downstream side of said one of said orifices, for sensing a pressure change across said one of said orifices; plate piston means carried by said split housing in engagement with said multi-orifice plate and provided in pressure-operating communication with said differential pressure selector means; and a horizontal adjusting bar slidably disposed in horizontal orientation in said split housing below said flow path of the fluid, said adjusting bar engaging said plate piston means, whereby said multi-orifice plate is vertically shifted in said hollow interior of said split housing to locate the other of said orifices in the path of the fluid, responsive to said pressure change and operation of said differential pressure selector means and said plate piston means and said multi-orifice plate is horizontally shifted in the housing responsive to manual horizontal adjustment of said horizontal adjusting bar.

14. The multi-orifice plate fitting and plate positioning apparatus of claim 13 wherein said plate piston means comprises a plate piston cylinder carried by the lower end of said split housing in fixed relationship; plate piston operating means provided in said plate piston cylinder; a plate piston disposed in said plate piston cylinder in contact with said plate piston operating means; and a piston rod carried by said plate piston and connected to said multi-orifice plate, whereby vertical movement of said plate piston and said piston rod responsive to operating of said plate piston operating means selectively forces said multi-orifice plate upwardly and downwardly in said hollow interior of said split housing.

15. The multi-orifice plate fitting and plate positioning apparatus of claim 13 wherein said differential pressure selector means comprises a pressure selector valve provided in pressure-sensing communication with said high pressure upstream side of said one of said orifices; at least two meter valve means provided in pressure-operating communication with said pressure selector valve and in pressure-sensing communication with said low pressure downstream side of said one of said orifices; and at least one optional control and recording meter means provided in pressure-operating communication with said meter valve means, respectively, and in pressure-sensing communication with said high pressure upstream side of said one of said orifices, whereby said optional control and recording meter means is selectively operated by said meter valve means, respectively, responsive to energizing of said pressure selector valve by said pressure change across said one of said orifices.

16. The multi-orifice plate fitting and plate positioning apparatus of claim 13 wherein:
(a) said plate piston means comprises a plate piston cylinder carried by the lower end of said split housing in fixed relationship; plate piston operating means provided in said plate piston cylinder; a plate piston disposed in said plate piston cylinder in contact with said plate piston operating means; and a piston rod carried by said plate piston and threadably connected to said multi-orifice plate, whereby vertical movement of said plate piston and said piston rod responsive to operation of said plate piston operating means shifts said multi-orifice plate vertically in said hollow interior of said split housing; and (b) said differential pressure selector means further comprises a pressure selector valve provided in pressure-sensing communication with said high pressure upstream side of said one of said orifices; at least two meter valve means provided in pressure-operating communication with said pressure selector valve and in pressure-sensing communication with said low pressure downstream side of said one of said orifices; and at least one optional control and recording meter means provided in pressure-operating communication with said meter valve means, respectively, and in pressure-sensing communication with said high pressure upstream side of said one of said orifices, whereby said optional control and recording meter means is selectively operated by said meter valve means, respectively, responsive to energizing of said pressure selector valve by said pressure change across said one of said orifices.

17. The multi-orifice plate fitting and plate positioning apparatus of claim 16 wherein said plate piston operating means comprises a coil spring.

18. The multi-orifice plate fitting and plate positioning apparatus of claim 16 wherein said plate positioning operating means comprises an operating fluid.

19. The multi-orifice plate fitting and plate positioning apparatus of claim 16 comprising pressure regulator means connected to said plate piston cylinder and said meter valve means for reducing air pressure to said plate piston cylinder.

20. The multi-orifice plate fitting and plate positioning apparatus of claim 13 comprising a remote transceiving unit adapted for receiving radio signals on a selected frequency and pneumatic switching valve means electrically connected to said remote transceiving unit and pneumatically connected to said differential pressure selector means and said plate piston means, whereby remote vertical adjustment of said multi-orifice plate is effected in said hollow interior of said split housing responsive to energizing of said remote transceiving unit by the radio signals and operation of said pneumatic switching valve means, said differential pressure selector means and said plate piston means.

21. The multi-orifice plate fitting and plate positioning apparatus of claim 20 wherein:
(a) said plate piston means further comprises a plate piston cylinder carried by the lower end of said split housing in fixed relationship; plate piston operating means provided in said plate piston cylinder; a plate piston disposed in said plate piston cylinder in contact with said plate piston operating means; and a piston rod carried by said plate piston and threadably connected to said multi-orifice plate, whereby vertical movement of said plate piston and said piston rod responsive to operation of said plate piston operating means shifts said multi-orifice plate vertically in said hollow interior of said split housing; and (b) said differential pressure selector means further comprises a pressure selector valve provided in pressure-sensing communication with said high pressure upstream side of said one of said orifices; at least two meter valve means provided in pressure-operating communication with said pressure selector valve and in pressure-sensing communication with said low pressure downstream side of said one of said orifices; and at least one optional control and recording meter means provided in pressure-operating communication with said meter valve means, respectively, and in pressure-sensing communication with said high pressure upstream side of said one of said orifices, whereby said optional control and recording meter means is selectively operated by said meter valve means, respectively, responsive to energizing of said pressure selector valve by said pressure change across said one of said orifices.

* * * * *